US006611566B2

(12) United States Patent
Shanbhag (10) Patent No.: US 6,611,566 B2
(45) Date of Patent: Aug. 26, 2003

(54) REFLECTION AND TRANSMISSION OF QUASI ORTHOGONAL VECTORS

(75) Inventor: Abhijit G. Shanbhag, San Diego, CA (US)

(73) Assignee: QualComm Incorporated, San Diego, CA (US)

( * ) Notice: Subject to any disclaimer, the term of this patent is extended or adjusted under 35 U.S.C. 154(b) by 0 days.

(21) Appl. No.: 09/832,277

(22) Filed: Apr. 10, 2001

(65) Prior Publication Data

US 2001/0031010 A1 Oct. 18, 2001

Related U.S. Application Data

(63) Continuation of application No. 09/148,100, filed on Sep. 4, 1998, now Pat. No. 6,240,143, which is a continuation-in-part of application No. 09/136,107, filed on Aug. 18, 1998, now Pat. No. 6,157,611.

(51) Int. Cl.[7] .............................................. H04L 27/04
(52) U.S. Cl. ..................................................... 375/295
(58) Field of Search ................................ 375/137, 145, 375/295, 298, 308, 140, 146; 370/204, 206, 208, 209

(56) References Cited

U.S. PATENT DOCUMENTS

| 5,327,455 | A | * | 7/1994 | De Gaudenzi et al. ...... 370/207 |
| 5,535,239 | A |   | 7/1996 | Padovani et al. |
| 5,991,333 | A | * | 11/1999 | Rice ............................. 370/479 |
| 6,064,690 | A | * | 5/2000 | Zhou et al. ................... 370/342 |
| 6,091,760 | A | * | 7/2000 | Giallorenzi et al. .......... 370/208 |
| 6,147,964 | A | * | 11/2000 | Black et al. .................. 370/209 |

FOREIGN PATENT DOCUMENTS

WO         9605668        2/1996

OTHER PUBLICATIONS

Golomb, Solomon W. "Shift–Register Sequences and Spread Spectrum Communications" IEEE 3rd Int'l Symposium on Spread Spectrum Techniques & Applications, pp. 14–15 (Jul. 4–6, 1994).
Boztas, et al. "4–Phase Sequences with Near Optimum Correlation Properties" IEEE Transactions on Information Theory 38(3): 1101–1113 (1992).
Sarwante, et al.: "Crosscorrelation Properties of Pseudorandom and Related Sequences" Proceedings of The IEEE 68(5): 593–619 (1980).

* cited by examiner

Primary Examiner—Emmanuel Bayard
(74) Attorney, Agent, or Firm—Philip Wadsworth; Kent D. Baker; Byron Yafuso (57) ABSTRACT

A transmission method in a communications system has an orthogonal vector and a quasi orthogonal masking function for obtaining a quasi orthogonal vector from the orthogonal vector. Message signals are transmitted according to the quasi orthogonal vector. The method includes receiving the quasi orthogonal masking function and permuting the quasi orthogonal masking function to provide a further quasi orthogonal masking function. The further quasi orthogonal masking function is applied to the orthogonal vector to provide a further quasi orthogonal vector. The further quasi orthogonal vector is applied to the message signal to provide an encoded message signal for transmitting the encoded message signal within the communications system.

3 Claims, 7 Drawing Sheets

REFLECTION AND TRANSMISSION OF QUASI ORTHOGONAL VECTORS

CROSS REFERENCE

This application is a continuation application of co-pending application Ser. No. 09/148,100, now U.S. Pat. No. 6,240,143 entitled "A Method and Apparatus for the Reflections and Transmission of Quasi Orthogonal Vectors" which is continuation-in-part of U.S. patent application Ser. No. 09/136,107, now U.S. Pat. No. 6,157,611 entitled "A Method and Apparatus for the Construction and Transmission of Quasi Orthogonal Vectors."

BACKGROUND OF THE INVENTION

I. Field of the Invention

This invention relates to the field of communications systems and, in particular, to the transmission of spread coded message signals within communications systems.

II. Description of the Prior Art

It is well known in the art of communications to mix message signals to be transmitted with spreading code vectors. This permits the message signals to be combined, transmitted, and separated from each other after transmission. The most useful feature of a set of code vectors suitable for this purpose is that the spreading code vectors are mutually orthogonal. This permits a theoretical interference of zero between the message signals. The code vectors most commonly used for this purpose are Walsh code vectors.

The total number of binary code vectors having a length $n$ is $2^n$. However, of the total number of binary vectors $2^n$ within the total vector space, only n are mutually orthogonal. For example, when n=8 there are 256 different binary vectors. Only 8 of the 256 vectors are mutually orthogonal. Therefore, in a system wherein n=8 usually only 8 message signals can be combined and separated in this manner and only 8 users can be supported simultaneously. Likewise, if n=128 then 128 users can be supported simultaneously. Some of the vectors can be idle some of the time, thereby permitting more than n users to be serviced. However, the size of the code vectors still places a limitation on the size of the communications system.

A set W of code vectors w meeting the orthogonality requirement for a theoretical interference of zero can be represented as follows:

$$w_1 = [w_{1,1} w_{1,2} \dots w_{1,n}]$$

$$w_2 = [w_{2,1} w_{2,2} \dots w_{2,n}]$$

$$\vdots$$

$$w_n = [w_{n,1} w_{n,2} \dots w_{n,n}]$$

wherein each vector $w_i$ is a column vector using a 0/1 alphabet or, equivalently, a −1/+1 alphabet. Hereinbelow, a set of code vectors using the 0/1 alphabet is expressed as $W_{b,n}$ and a set using the −1/+1 alphabet is expressed as $W_n$.

Since all vectors w in the set W are orthogonal to each other, the dot product of any two vectors in the set must be zero. This can be represented as:

$$(w_x, w_y) = 0$$

where x and y can have any values between 1 and n, x≠y and $(w_x, w_y)$ is equal to:

$$\sum_{i=1}^{n} w_{x,i}, w_{y,i}.$$

Equivalently, the above can be expressed as the following matrix product:

$$w_x^T w_y = 0.$$

Also:

$$w_x^T w_x = n.$$

Representing the ith data symbol to be transmitted as $d_i$ and the total number of transmit signals as k, the total transmission signal S transmitted by a base station to a mobile station is:

$$S = \sum_{i=1}^{k} d_i w_i$$

The mobile station receives the total transmission signal S and tries to eliminate all message signals except its own.

In order to eliminate the other messages the mobile station can multiply signal S by the transpose of its own Walsh code vector. An example wherein i=1 is as follows:

$$w_1^T S = w_1^T \sum_{i=1}^{k} d_i w_i$$

$$= w_1^T \left( d_1 w_1 + \sum_{i=2}^{k} d_i w_i \right)$$

wherein the first term on the right side represents the wanted signal. The second term in the right side represents the interference from all of the remaining message signals mixed with their individual Walsh codes. Solving this equation yields:

$$w_1^T S = n d_1 + 0.$$

Thus, the separation of the transmitted message signals at the receiver depends on a zero correlation between the wanted signal and all of the other message signals.

In order to utilize communications systems as effectively as possible it is desirable to simultaneously transmit and separate as many message signals as possible. However, it is only possible to mix n message signals and separate them with zero interference because only n orthogonal vectors are available, as previously described. To overcome this limitation it is known to use quasi orthogonal functions. Quasi orthogonal vectors are vectors that are in addition to the n orthogonal vectors. Quasi orthogonal vectors have been selected from the remaining code vectors in the total binary $2^n$ vector space in order to provide as little interference as possible. Specifically, quasi orthogonal vectors are selected to provide a level of interference that is within acceptable limits, even though the level of interference is not zero.

In order to select quasi orthogonal vectors a computer search can be performed within the total $2^n$ vector space for binary (+1/−1 alphabet) masks. The masks can be applied to the orthogonal vectors to form a new set of vectors that are quasi orthogonal vectors. Applying a total of M masks to a set of Walsh code vectors $w_n$, the number of quasi orthogonal functions produced is: (M+1)n. Applying a mask m to a code vector w∈$W_n$ includes a component by component multiplication of the mask m and the orthogonal code vector w to give the new code vector:

$$w_m = w \cdot m$$

The interference resulting from the use of the new code vectors can be tested and the code vectors that provide the lowest correlation can be selected to provide a set of quasi orthogonal vectors. A plurality of such masking functions can be found in order to provide a plurality of sets of quasi orthogonal vectors from a single set of orthogonal vectors. In order to permit message signals mixed with the quasi orthogonal vectors found by the computer search to be separated from each other, the quasi orthogonal vectors should be mutually orthogonal with respect to each other. There is a non-zero correlation between at least one code vector in the orthogonal set and one vector in the quasi orthogonal set.

Representing the quasi orthogonal vectors as v it can be shown that:

$$\frac{1}{n}\sum_{j+1}^{n}((v, w_j)^2) = \frac{1}{n}$$

The goal in picking quasi orthogonal vectors v is to pick the vectors such that $$1 \leq i \leq n\{|(\underline{v}, \underline{w}_i)|\}^{max}$$

is as small as possible.

Since their correlation is a useful measure of the amount of separation between vectors, the normalized correlation between two code vectors x and y can be defined as:

$$(x, y) = \frac{1}{n}\sum_{i=1}^{n}x_1 y_i^*$$

The correlation between two orthogonal vectors is zero. A lower absolute value of correlation results in better separation between message signals mixed with the orthogonal vectors and the ones mixed with quasi orthogonal vectors. Better signal separation results in lower interference between the signals at the time of decoding. Better signal separation results in lower interference between the signals at the time of decoding.

The mean square correlation between orthogonal vectors and their corresponding quasi orthogonal vectors where n is a power of two is 1/n. The lower bound on the absolute value of correlation can be shown to have the value, 1/√n. This quantity is referred to as the Holtzman lower bound. Masks have been found that meet the lower bound for cases wherein n is an even power of two. However, in cases where n is an odd power of two this bound has not been met with an equality. The lowest correlation found in the latter case is √2/√n. Therefore, the interference of the best quasi orthogonal vectors found in the odd power of two case using the computer search technique is √2 times the theoretical limit.

Thus it desirable to find additional quasi orthogonal vectors having lower correlation with the orthogonal vectors for the case wherein n is an odd power of two, in order to expand the capacity of communications systems while maintaining acceptably low amounts of interference.

SUMMARY OF THE INVENTION

A transmission method in a communications system has an orthogonal vector and a quasi orthogonal masking function for obtaining a quasi orthogonal vector from the orthogonal vector. Message signals are transmitted according to the quasi orthogonal vector. The method includes receiving the quasi orthogonal masking function and permuting the quasi orthogonal masking function to provide a further quasi orthogonal masking function. The further quasi orthogonal masking function is applied to the orthogonal vector to provide a further quasi orthogonal vector. The further quasi orthogonal vector is applied to the message signal to provide an encoded message signal for transmitting the encoded message signal within the communications system.

BRIEF DESCRIPTION OF THE DRAWINGS

The features, objects, and advantages of the present invention will become more apparent from the detailed description set forth below when taken in conjunction with the drawings in which like reference characters identify corresponding elements throughout and wherein.

DETAILED DESCRIPTION OF THE INVENTION

In the signal transmission method of the present invention, masks m are constructed and applied to orthogonal code vectors in order to provide quasi orthogonal code vectors, wherein the masks are four phase or quaternary phase shift keying (QSPK) masks. Thus the masks m have an alphabet of four elements, {±1, ±j}, rather than two elements, where j=√−1 is the imaginary root of unity. It will be understood that the signal transmission method of the present invention can require two masks m when transmitting a message signal. One of the two masks can be used for the in phase (I) channel and one can be used for the out of phase (Q) channel.

In order to practice the transmission method of the present invention, the new masks m can be generated using linear feedback shift registers (LFSR). A $2^k$-ary LFSR sequence s[t] is a sequence having symbols {0, 1, . . . , $2^k$−1} where k is limited to the value 1 in the binary case and two in the quaternary case. The sequence satisfies a linear recurrence relationship of the form:

$$\sum_{i=0}^{r} c_i s(t+i) = 0 (mod\, 2^k), \forall\, t > 0$$

where $r \geq 1$ is the degree of the recursion. The coefficients $c_i$ belong to the set $\{0, 1, \ldots, 2^k-1\}$ and $c_r \neq 0$. This type of sequence s[t] has a characteristic polynomial:

$$c(x) = \sum_{i=0}^{r} c_i x^i$$

When k=1, the sequence s[t] is periodic with a period that is less than or equal to $2^r-1$. If the period of the sequence s[t] reaches the maximum value $2^r-1$, the characteristic polynomial of s[t] is defined as a primitive polynomial and the sequence s[t] is an m-sequence. Sequences of this type are taught in S. W. Golomb, "Shift Register Sequences," Holden Day, San Francisco, Calif., 1967.

A code matrix C' includes one period of an m-sequence and one period of each of its cyclic shifts. Thus, the size of the code matrix C' is $2^r-1$. The code matrix C' can be extended by appending a zero bit to each code word in matrix C'. The zero is appended at the same bit location of each code word. The inclusion of an all zero vector in this manner forms the code matrix C from the code matrix C'. The code matrix C has a length $2^r$ and a size $2^r$. In one embodiment the code matrix C can be columnwise and rowwise permuted to create the Walsh code $W_{b,2^r}$ of size $2^r$. However, it is sufficient to obtain permutation matrix P such that the set of row vectors of the matrix product CP are the same as the set of row vectors of $W_{b,2^r}$.

Figure 1:
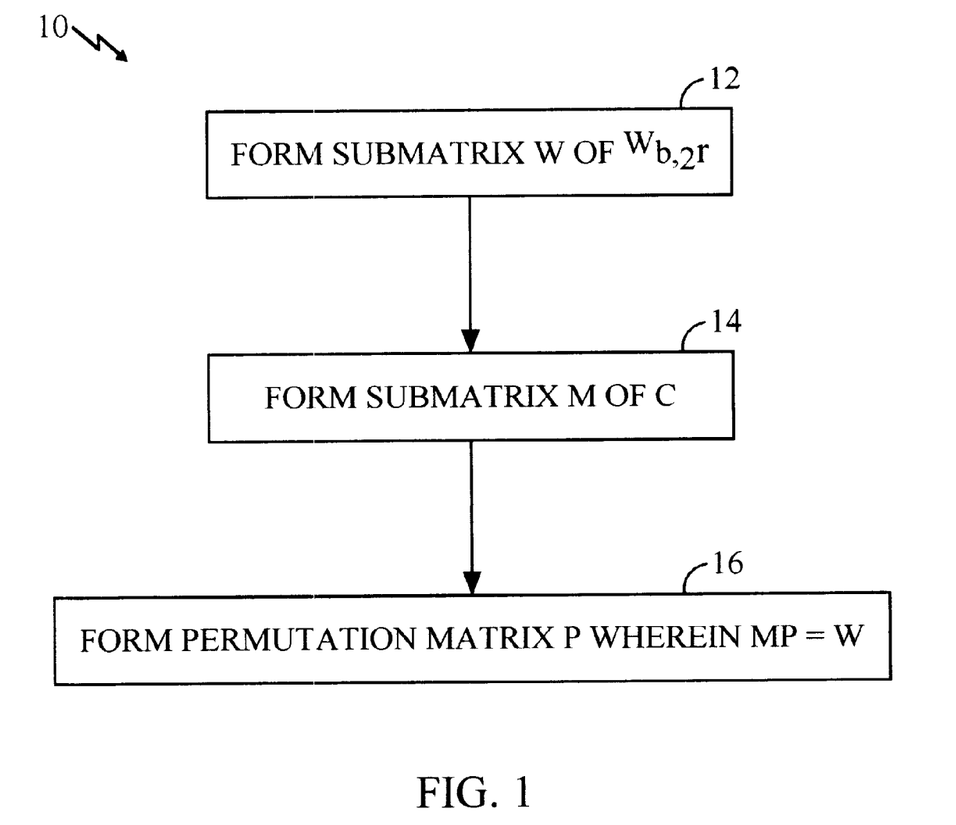
FIG. 1 shows a block diagram representation of a permutation matrix algorithm suitable for use in the method of the present invention.

Referring now to FIG. 1, there is shown permutation matrix algorithm 10 which is suitable for use in the present invention. In permutation matrix algorithm 10 a submatrix W of matrix $W_{b,2^r}$ is formed as shown in block 12. The submatrix W includes r rows having indices $1, 2, 4, \ldots, 2^{r-1}$. Note that the indexing of $W_{b,2^r}$ is zero based and ranges from 0 to $2^r-1$. Matrix W therefore has r rows and $2^r$ columns. Every column of matrix W is distinct from all of the other columns.

A submatrix M of code matrix C is then formed as shown in block 14 of permutation matrix algorithm 10. Submatrix M has r rows and $2^r$ columns. In order to form submatrix M an intermediate submatrix M' having r rows and $2^r-1$ columns is formed. Submatrix M' is formed by adding a column containing all zeros to submatrix M. The first row of submatrix M' can be any cyclic shift of the m-sequence used in constructing code C. The r−1 rows of submatrix M' following the first row are successive shifts by one time unit in each case beginning with the first row. Every column of submatrix M is distinct.

A permutation matrix P such that MP=W is then determined as set forth in block 16 of permutation matrix algorithm 10. Permutation matrix P is the required output of algorithm 10. Because submatrices M and W have the same set of distinct columns the determination of P in this manner is straightforward. In an alternate embodiment of the invention permutation matrix P can be determined using a matrix computation technique. It will be understood by those skilled in the art that the rows of the matrix CP are the same as the rows of $W_{b,2^r}$.

When k=2, and sequences therefore have a quaternary alphabet, a sequence known as Family A can be determined.

The Family A sequence is taught, for example, in S. Boztas, P. V. Kumar, R, Hammons, "4-Phase Sequences with Near-Optimum Correlation Properties," IEEE Transactions on Information Theory, IT-38 No. 3 (May 1992), pp 1101–1113. In order to obtain a Family A sequence, let c(y) be a binary primitive polynomial of degree r. A polynomial g(x) having coefficients in the set $\{0, 1, 2, 3\}$ can be lifted from the polynomial c(x) as follows:

$$g(x^2) = (-1)^r c(x) c(-x) (mod\, 4)$$

Such a lift of the binary polynomial c(x) to the quaternary polynomial g(x) is a special case of the Hensel lift of polynomials. For example, see B, R, MacDonald, "Finite Rings with Identity," Marcel Dekker, Inc., New York, 1974. The LFSR sequence with the characteristic polynomial g(x) is defined to be a Family A sequence. The sequence has a period $2^r-1$.

Figure 2:
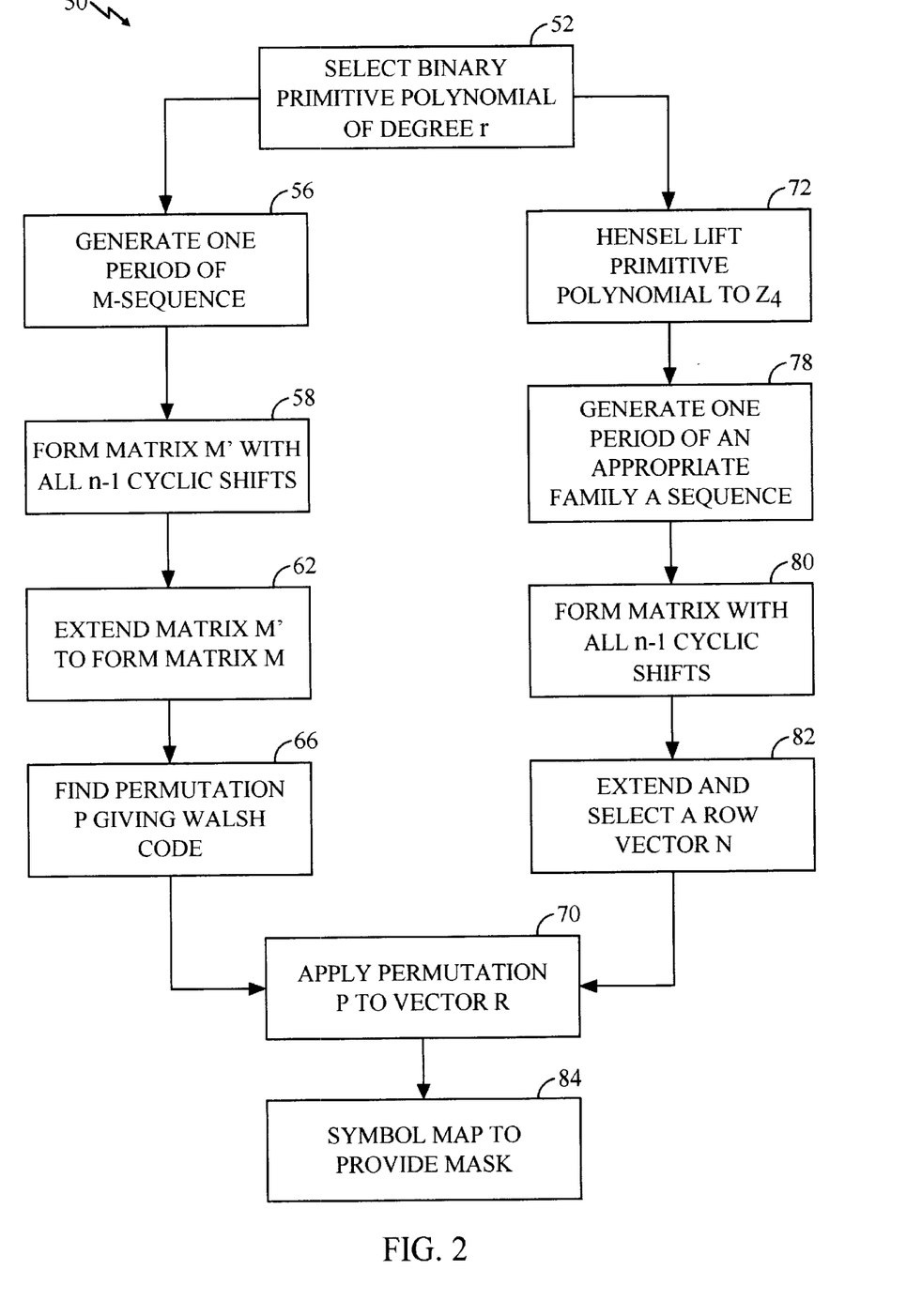
FIG. 2 shows a block diagram representation of the quasi orthogonal mask generation algorithm of the present invention.

Referring now to FIG. 2, there is shown quasi orthogonal mask generation algorithm 50. Quasi orthogonal mask generation algorithm 50 can be used to construct four-phase masks for forming quasi orthogonal vectors of length $2^r$. In mask generation algorithm 50 a binary primitive polynomial c(x) of degree r is provided as shown in block 52. Using primitive polynomial c(x) as its characteristic polynomial, a period of an m-sequence is constructed as shown in block 56.

Matrix M' having dimensions $(2^r-1) \times (2^r-1)$ is constructed as shown in block 58. The rows of matrix M' each contain a period of the m-sequence of block 56 along with all of its cyclic shifts. Matrix M' is then extended to form matrix M as shown in block 62. The extension of matrix M' is performed by adding an all zero column and an all zero row to matrix M'. The dimensions of matrix M are therefore $2^r \times 2^r$. For convenience, the first column of matrix M can be the all zero column. As set forth in block 66 a permutation P is found which column permutes the matrix M to contain the same row vectors as those contained in $W_{b,2^r}$. The permutation matrix method taught hereinabove, or any other method known to those skilled in the art, can be used to perform the operations of block 66.

A Hensel lift is then performed on the primitive polynomial c(x) obtained in block 62 of mask generation algorithm 50 to provide the polynomial g(x) as described hereinabove. The Hensel lift operation is shown in block 72. One period of the Family A sequences with the polynomial g(x) as its characteristic polynomial is generated as shown in block 78. A sequence of the Family A sequences is selected. The selected sequence can be any one of the Family A sequences having at least one symbol equal to one or three.

A vector N' of length $(2^r-1)$ is constructed. The vector N' consists of a period of the Family A sequence selected according to block 78. A vector N of length $2^r$ is formed by appending a zero bit at the first bit location to vector N'. As shown in block 70 the vector N is then column permuted using the permute P found in block 66. The resulting permuted code word can be used as a masking function for generating quasi orthogonal vectors according to the method of the present invention. The quasi orthogonal vectors generated in this manner can be used with symbol mapping to (+1, −1, +j, −j). A total of 127 masks can be generated in this manner for a length 128 Walsh code. Two of the masks generated according to quasi orthogonal mask algorithm 50 are set forth in Table I.

TABLE I

[1j1j1j1j1j1j1j1j1j1j1j-1-j-1-j-1-j-1j1j-1-j-1-j1j1j-1-j
-1-j1j1j-1-j-1-j-1-j-1-j1j1j1j-1-j1j-1-j1j-1-j1j-1-j1j-1-j1j1j-1
-j-1-j1j-1-j1j1j-1-j-1-j1j1j-1-j-1-jj1j1j-1-j-1-j1j-1-j1j1j-1-j]
[1j1j1j1j-1-j-1-j1j1j1j-1-j1j-1-j1j-1-j-1-j1j1j-j1-j-1j-1j-1j-1j
-1j-1j1j-1j-1j1-j-1-j1j1-j1-j-1-j1j-1j-1-j1j-1j1j-1-jj1-j1-j1
-j1-j1-j1j-1j-1j1-j-1-j-1j1-j-1j1-j-1j1-j-1j1j1j-j-1-j-1j1j1j1j1]

Figure 3:
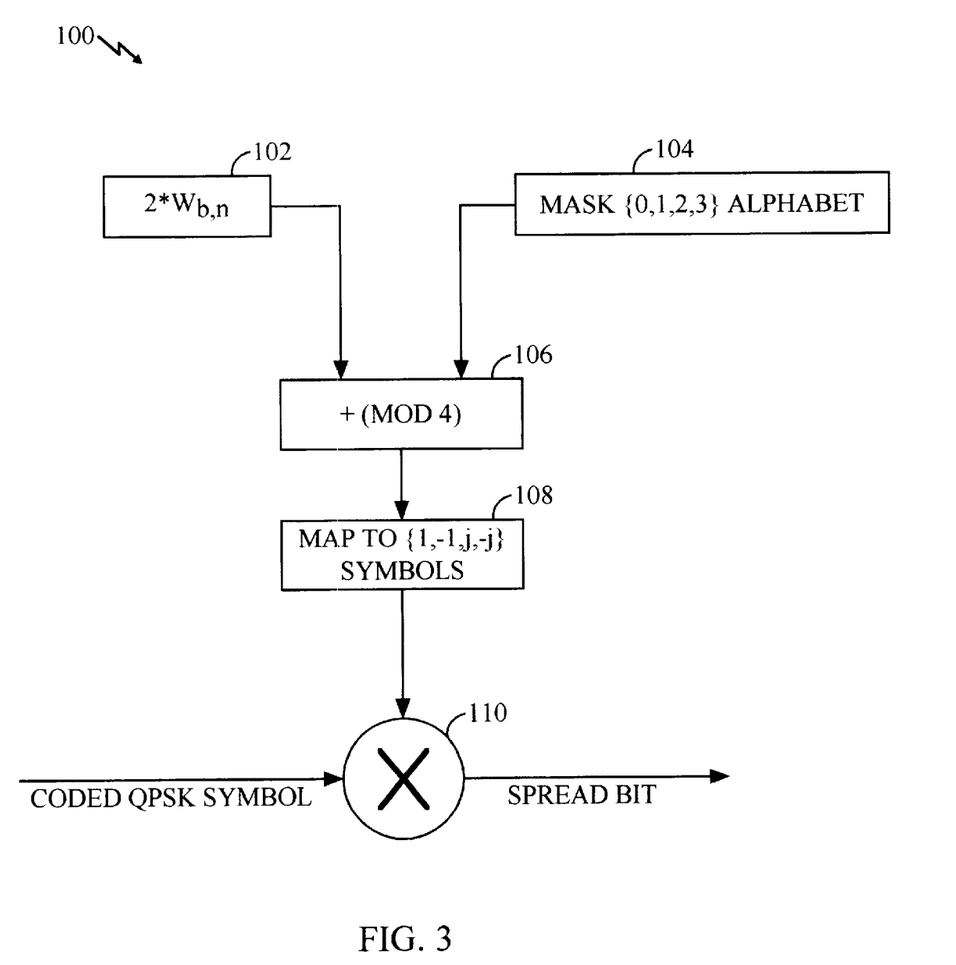
FIG. 3 shows a block diagram representation of a method for mapping vectors that is suitable for use in the method of the present invention.

Referring now to FIG. 3, there is shown vector mapping function 100. As shown in vector mapping function 100 a quasi orthogonal vector mask can be represented equivalently with symbols from the {0, 1, 2, 3} alphabet or with symbols from {+1, -1, +j, -j} alphabet of Table I using the mapping:

0→1
1→j
2→-1
3→-j

As shown in blocks 102, 104, respectively, the (0/1) Walsh code vectors (multiplied by two) and the masks in the {0, 1, 2, 3} alphabet can be added using modulo 4 adder 106. The result of the addition is mapped into a {+1, -1, +j, -j} alphabet as shown in mapping block 108. The output of mapping block 108 can be applied to coded QPSK symbols by mixer 110 to provide a coded message signal output for transmission.

The correlation between any code vector in the Walsh code and any code vector obtained by applying the masks of Table I to the Walsh code vectors is $$\{\pm 1/16 \pm j/16\}.$$

Thus, the maximum absolute correlation is $$\frac{1}{8}\sqrt{2} = \frac{1}{\sqrt{n}}$$

and the theoretical lower bound on the correlation set forth hereinabove is met with equality. Furthermore, the method of quasi orthogonal mask generation algorithm 50 can be generalized to all powers of two to yield the optimal quasi orthogonal vectors for each power of two. Table II sets forth the correlations and the number of masks provided according to the method of the present invention for several powers of two.

TABLE II

| Length | Maximum Absolute Correlation With Walsh code | Correlation Spectrum | Number Of Available Masks |
|---|---|---|---|
| 32 | 0.177 | $\{\pm\frac{1}{8} \pm \frac{j}{8}\}$ | 31 |
| 64 | 0.125 | $\{\pm\frac{1}{8}, \pm\frac{j}{8}\}$ | 63 |
| 128 | 0.0833 | $\{\pm\frac{1}{16} \pm \frac{j}{16}\}$ | 127 |
| 256 | 0.0625 | $\{\pm\frac{1}{16}, \pm\frac{j}{16}\}$ | 255 |
| 512 | 0.0442 | $\{\pm\frac{1}{32} \pm \frac{j}{32}\}$ | 511 |

In addition to the four phase case described herein, the present invention provides for the construction and transmission of binary quasi orthogonal code vectors using masking functions obtained using the present invention. When the length of a masking function in the binary case is an even power of two the method of the present invention provides quasi orthogonal functions having the optimal correlation with the Walsh code. When the length of the masking function is an odd power of two, the correlation between any pair of sets is as least as good as the known results using binary alphabets.

It will be recalled that in a $2^k$-ary linear feedback shift register s[t] is a sequence with symbols $\{0, 1, \ldots, 2^k-1\}$ that satisfies the relationship set forth hereinabove. Such a sequence s[t] has a characteristic polynomial c(x) that is defined as also set forth hereinabove. The method for forming binary quasi orthogonal vectors is restricted to the case corresponding to k=1.

When k=1 the sequence s[t] is periodic with a period less than or equal to $2^r-1$. If the period of the sequence s[t] reaches the maximum value $2^r-1$ the characteristic polynomial of s[t] can be defined as a binary primitive polynomial. In this case the sequence s[t] is defined as an m-sequence.

A code matrix C' can be defined to consist of one period of an m-sequence m1 with characteristic polynomial c(x) and one period of all of the cyclic shifts of the m-sequence m1. Thus the size of the code matrix C' is $2^r-1$. The code matrix C' can be extended by appending a zero bit to each code word within matrix C' at the same bit location of each code word. In the preferred embodiment, the appended zero bits can be placed at the first bit location of each code word within matrix C.

When the all zeros vector is applied to code matrix C' in this manner, code matrix C is formed. Code matrix C has a size of $2^r \times 2^r$. Code matrix C can be columnwise and rowwise permuted to form the Walsh code $W_{b,2^r}$ and a record of the permutation operations required to form $W_{b,2^r}$ can be made. However, in the method of the present invention the permutation matrix P can be applied to form the product CP and obtain the same vectors as the set of row vectors of $W_{b,2^r}$.

Figure 4:
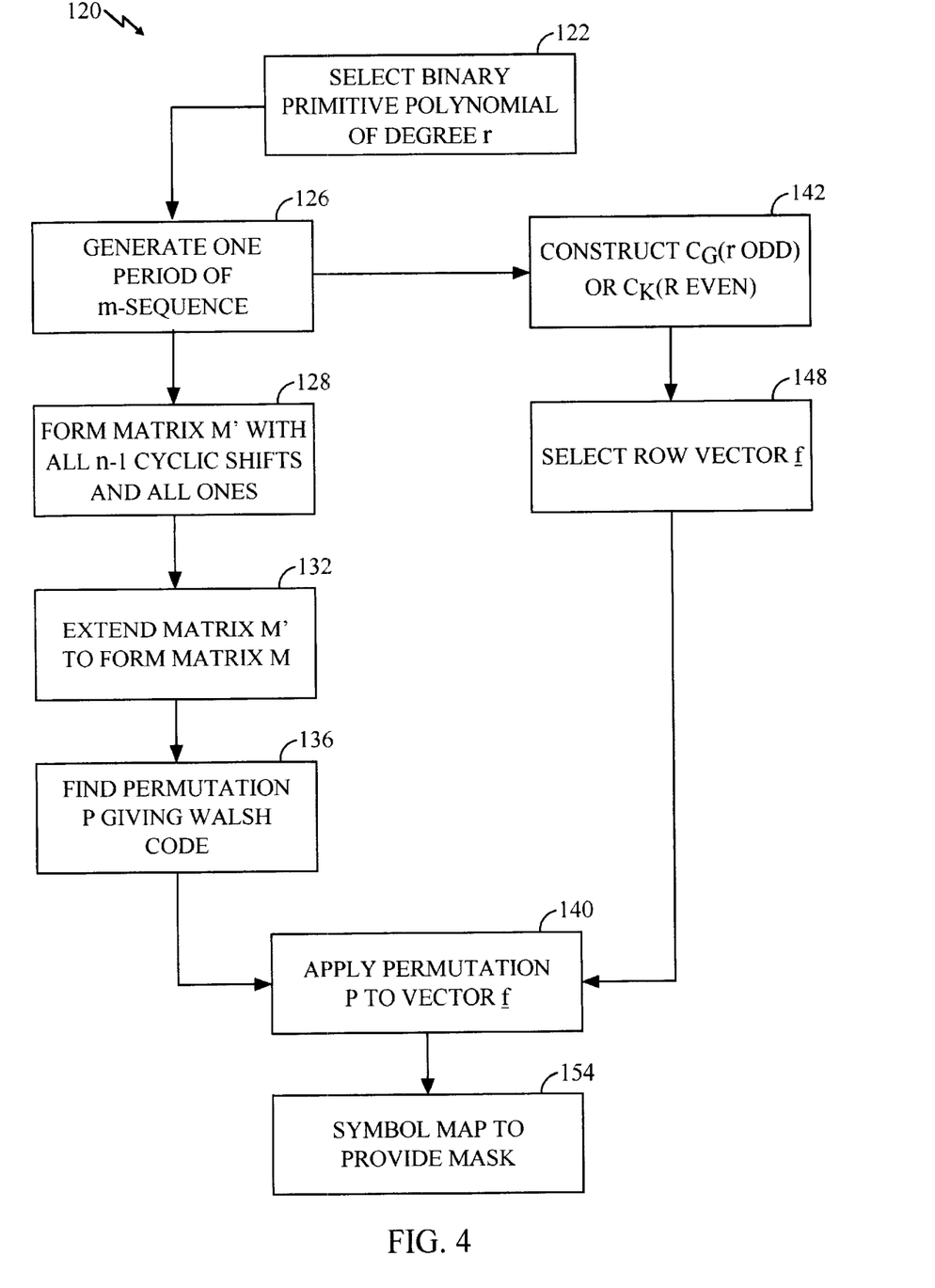
FIG. 4 is a block diagram representation of the quasi orthogonal mask generation algorithm of the present invention in a form suitable for use in the binary case.

Referring now to FIG. 4, there is shown binary quasi orthogonal mask generation algorithm 120. Binary quasi orthogonal mask generation algorithm 120 can be used to construct two phase masks for forming quasi orthogonal vectors of length $2^r$. In mask generation algorithm 120 a binary primitive polynomial c(x) of degree r is provided as shown in block 122. Using primitive polynomial c(x) as its characteristic polynomial, a period of an m-sequence is constructed as shown in block 126.

Matrix M' having dimensions $(2^r-1) \times (2^r-1)$ is constructed as shown in block 128. The rows of matrix M' each contain a period of the m-sequence of block 126 along with all of the cyclic shifts of the m-sequence. Matrix M' is then extended to form matrix M as shown in block 132. The extension of matrix M' is performed by adding an all zero column and an all zero row to the matrix M'. The dimensions of matrix M are therefore $2^r \times 2^r$. In the preferred embodiment, the first column of the matrix M can be the all zero column. As set forth in block 136 a permutation P is found that column permutes the matrix M to contain the same row vectors as those contained in $W_{b,2^r}$ and a record of the required permutation operations can be made.

The permutation matrix method taught hereinabove, or any other method known to those skilled in the art, can be used to perform the operations of block 136. A code matrix $C_G$ or a code matrix $C_K$ is then formed as shown in block 142 of binary quasi orthogonal mask generation algorithm 120. The code matrix $C_G$ is formed in cases where the degree of the primitive polynomial r is odd and the code matrix $C_K$ is formed when r is even.

Figure 5:
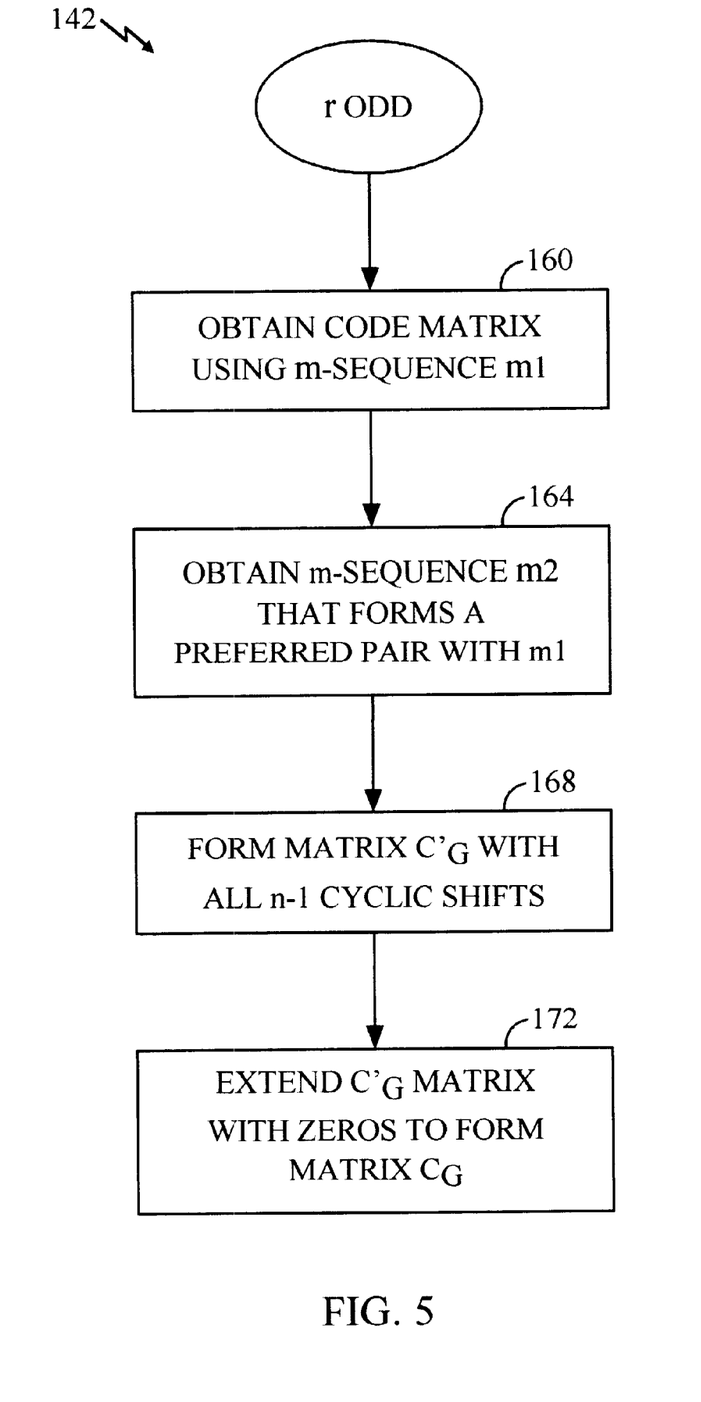
FIG. 5 is a more detailed representation of a matrix generation step of one embodiment of the mask generation algorithm of FIG. 4.

Referring now to FIG. 5, there is shown a more detailed representation of block 142 in the case where r is odd. A sequence m2 that forms a preferred pair with the m-sequence m1 is obtained as shown in block 160. A preferred pair of m-sequences is a pair of m-sequences having a period 2m–1. The preferred pair has the preferred three-valued cross correlation function $\{-1 \pm 2^{m+1/2}, -1\}$ when m is odd. The construction of preferred pairs of m-sequences is taught, for example, by D. Sarwate and M. Pursley, "Crosscorrelation Properties of Pseudorandom and Related Sequences," Proceedings of the IEEE, pp. 593–620, May 1980. The sequence m2 has a period $2^r-1$.

The code matrix $C'_G$ is then formed from the sequence m2 as shown in block 168. It is a matrix having one period of each of the m-sequence m2 and all of its distinct cyclic shifts. The number of rows in matrix $C'_G$ is $2^r-1$ and the number of columns is $2^r-1$. The code matrix $C_G$ is formed from the code matrix $C'_G$ by extending the matrix $C'_G$ as shown in block 172. The extension of the matrix $C'_G$ can be performed by appending a zero bit at the same bit location of each code word in the matrix $C'_G$. The bit location used for appending the zero can be the first bit location in the preferred embodiment. The number of rows in code matrix $C_G$ is $2^r-1$ and the number of columns is $2^r$.

Figure 6:
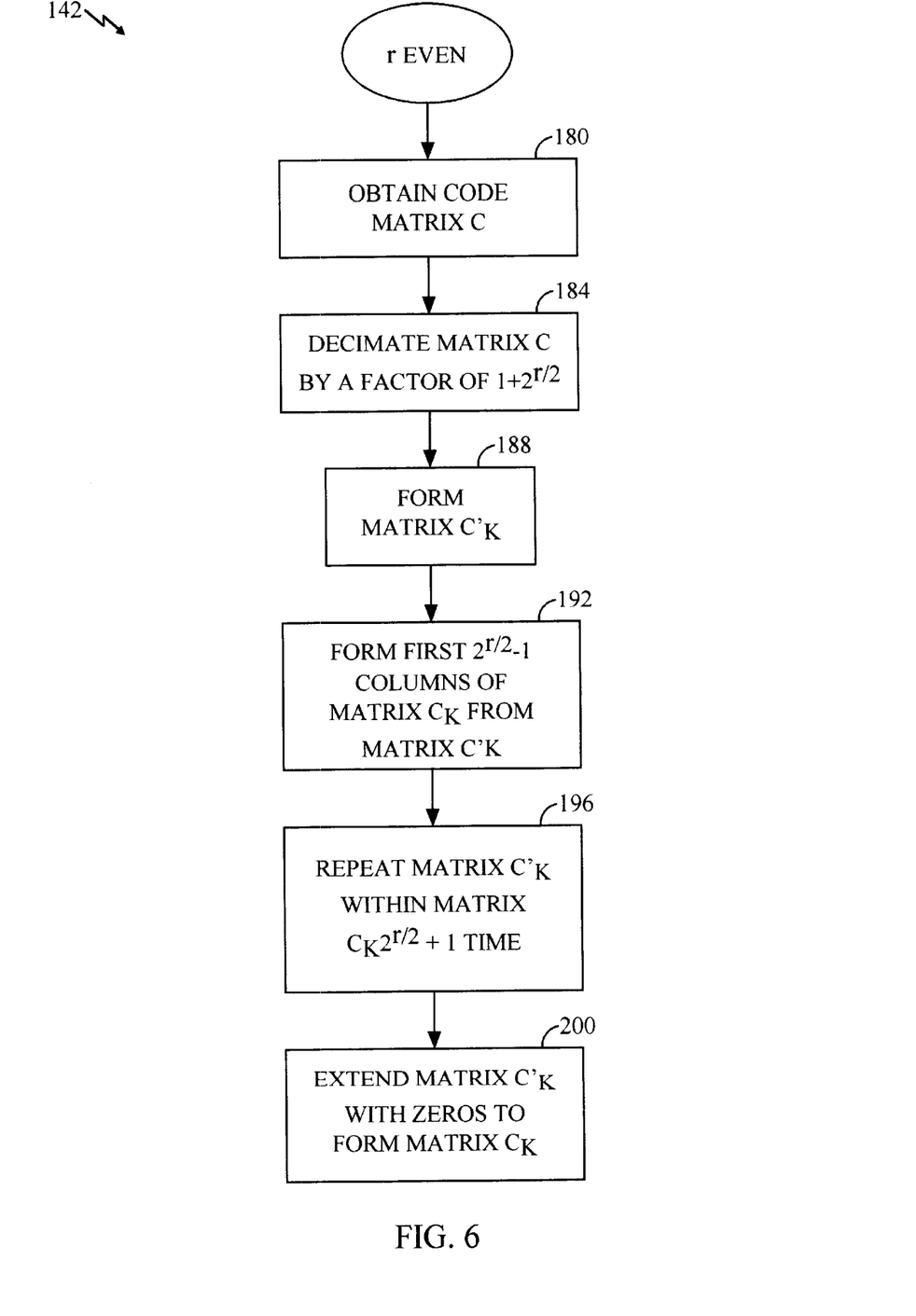
FIG. 6 is a more detailed representation of the matrix generation step in another embodiment of the mask generation algorithm of FIG. 4.

Referring now to FIG. 6, there is shown a more detailed representation of block 142 of binary quasi orthogonal mask generation algorithm 120 in the case wherein the degree of the primitive polynomial r is even. In block 180 of FIG. 6 a code matrix C is obtained as previously described. The code matrix C is then decimated by a factor of $1+2^{r/2}$. The sequence m3 is the m-sequence obtained from the m-sequence m1 by decimating the sequence m1 by a factor $1+2^{r/2}$. The sequence m3 has a period of $2^{r/2}-1$.

In the decimation process of block 184 predetermined columns of C are selected and the remaining columns are not selected as follows. Let $C_0$ be the all zeros column of C. If $C_i$ is the ith column of code matrix C and $C_{K,i}$ is the ith column of code matrix C formed by decimating the code matrix C then:

$$C_{K,1} = C_1$$
$$C_{K,2} = C_{1+2^{r/2}}$$
$$C_{K,3} = C_{2(1+2^{r/2})}$$
$$C_{K,i} = C_{(i+1)(1+2^{r/2})}$$
$$\vdots$$
$$C_{K',2^{r/2}-1} = C_{(2^{r/2}-2)(1+2^{r/2})+1}$$

This decimation operation is an operation $C_K$, $2^{r/2-1}$, that is known in the art.

A code matrix $C_K'$ is formed as shown in block 188. The formation of the matrix $C_K'$ is begun by inserting one period of length $2^{r/2}-1$ of the m3 sequence and all its distinct cyclic shifts. This forms the first $2^{r/2}-1$ columns of code matrix $C_K'$. The first $2^{r/2}-1$ columns are then repeated $2^{r/2}+1$ times as shown in block 196. A code matrix $C_K$ can then be obtained by appending a zero bit at the first location of each code word in the preferred embodiment within the matrix $C_K'$ as shown in block 200. The size of the code matrix $C_K$ can be $2^{r/2}-1$ wherein the size is understood to indicate the number of row vectors.

Thus, using the method of the present invention it is possible to construct quasi orthogonal functions for all powers of two in the binary case wherein k=1. Additionally, the method of the present invention can provide many more masking functions than were available in the prior art. The number of masking functions obtained using binary quasi orthogonal mask generation algorithm 120 for some exemplary values of length n are set forth in Table III along with the maximum absolute correlation with the Walsh code and the correlation spectrum.

TABLE III

| Length | Maximum Absolute Correlation With Walsh code | Correlation Spectrum | Number Of Available Masks |
|---|---|---|---|
| 32 | 0.25 | $\{0, \pm \frac{1}{4}\}$ | 31 |
| 64 | 0.125 | $\{\pm \frac{1}{8}\}$ | 7 |
| 128 | 0.125 | $\{0, \pm \frac{1}{8}\}$ | 127 |
| 256 | 0.0625 | $\{\pm \frac{1}{16}\}$ | 15 |
| 512 | 0.0625 | $\{0, \pm \frac{1}{16}\}$ | 511 |

Returning now to FIG. 4, execution of binary mask generation algorithm 120 proceeds from block 142, which is described in more detail in FIGS. 5 and 6. In block 148 of mask generation algorithm 120 a row vector f of either code matrix $C_G$ or code matrix $C_K$ is selected. The permutation P determined herein is then applied to the row vector f as shown in block 140. As set forth in block 154, and previously described herein, a mask can be provided according to the permutation. The mask can be applied to orthogonal vectors to provide quasi orthogonal vectors.

A lower bound on the minimum correlation between a quasi orthogonal function set and the set of Walsh codes is known as previously described. Furthermore, the minimum correlation has been attained for all code lengths that are a power of two as also described above. Additionally, the constructions of the four phase symbols, the constellation alphabet, is known in the set {+1, –1, +j, –j}. However, the masking functions obtained are not necessarily optimized for some specific cases, such as some higher data rate cases. For example, in the so called fat-pipe environment where data rates are increased by giving the user two Walsh codes of length n/2 rather than the original Walsh code of length n some of the masking functions are not optimum. In this case the correlation of some subblocks of the quasi orthogonal functions with the corresponding shorter length Walsh code can be suboptimal. Thus, further permuting steps are set forth that can be applied to the masking functions obtained above. With appropriate permutations, new masking functions can be obtained that are optimal in the case where the user is given two n/2 codes.

Let n be the length of any code vector in a Walsh code wherein n is an integer power of two. A vector $v=(v_1, \ldots, v_n)$ is a unit vector if:

$$\frac{1}{n}\sum_{i=1}^{n} v_i^2 = 1$$

The maximum absolute correlation satisfies the following lower bound:

$$\max\{|(\underline{v}, \underline{w_i})| : \underline{w_i} \in W_n\} \geq \frac{1}{\sqrt{n}}$$

where $W_n$ is the Walsh code of length n and the vector v has symbols that are complex roots of unity. Four phase masks that meet the above bound with equality have been obtained, thus proving the sharpness of the above bound.

For any two non-negative integers i, k, $0 \leq i < k \leq n$, let $v_{1,k}=[v_i, v_{i+1}, \ldots, v_k]$. Furthermore, let $n_1 \leq n$, be an integer power of two and let j be a positive integer such that $j \cdot n_1 \leq n$. The objective is to obtain the mask v of length n such that, for every such integer $n_1$, j, the following is satisfied:

$$\max\left\{\left|\left(\underline{v}_{(j-1)n_1+1:jn_1}, \underline{w_i}\right)\right| : \underline{w_1} \in W_{n_1}\right\} = \frac{1}{\sqrt{n_1}}$$

Figure 7:
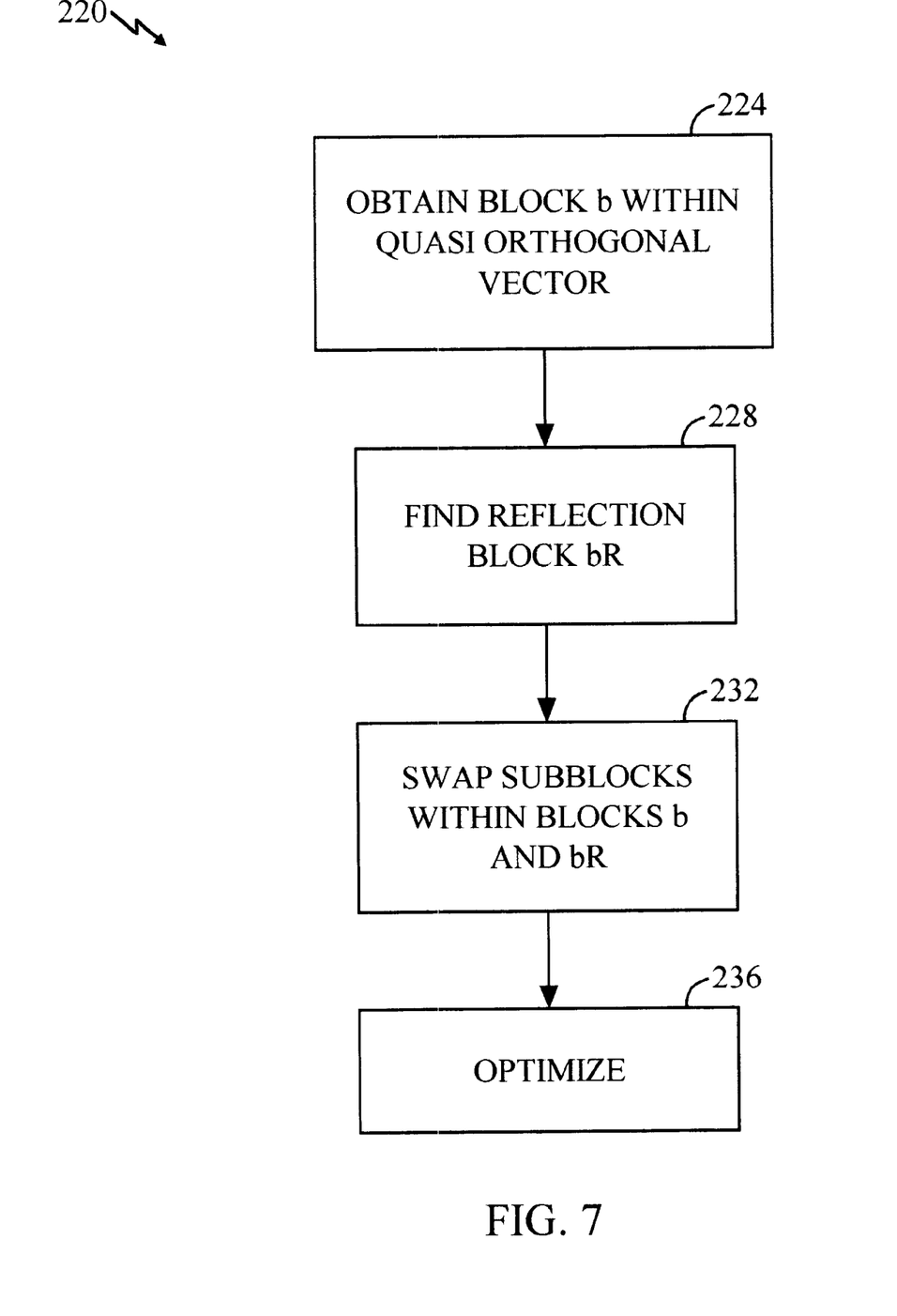
FIG. 7 is a flow chart representation of a permutation that can be performed upon the quasi orthogonal vectors of the present invention.

Referring now to FIG. 7, there is shown mask generation algorithm 220, the masking functions obtained above can be further permuted in to preserve their optimal correlation with the Walsh code of same length. For example, any permutation within the automorphism group of the first order Reed-Muller codes of the same length can be applied to the masking function that leaves the correlation with the Walsh code of same length unchanged. These permutations can also be applied systematically to obtain permuted masking functions optimal for fat pipe transmission in the sense of the latter equation.

Consider a segment referred to as block b having a length L chips as shown in block 224. The length of L is an integer power of two. Obtain a reflection block bR of block b as shown in block 228. The block b has its first chip at chip location k. The block bR is a reflection of the block b about an integer point, where $L \leq x < n$, if the block bR has length L chips, and the first chip of bR is at the chip location x+k. While any kind of permutation known to those skilled in the art can be used one very useful permutation is one that leaves the correlation with the Walsh code of same length unchanged. This permutation is obtained by swapping sub-blocks of length L chips, where L is an integer power of 2, by their reflections w.r.t. around the center point as shown in block 232. It will be understood that reflections around other points can also be used.

In one embodiment of the invention a complex quasi orthogonal function mask of a required length is constructed using the methods taught herein. For optimization in the shorter Walsh code case, subblocks of length two can be optimized. Procedures for performing this optimization include swapping symbols as previously described. Sub-blocks of length two obtained previously are swapped to provide subblocks of length four. The subblocks with length four are obtained to provide optimal correlation with the corresponding Walsh code of length four. This process is continued recursively, so that at step k+1, sub-blocks of length 2k with optimal correlation with the Walsh code of length 2k are obtained as shown in block 236. Up to $\log_2 n$ steps can be required in order to obtain the fatpipe optimal quasi orthogonal functions.

Using these steps, it is thus possible to obtain fat-pipe optimal quasi orthogonal functions. These steps were carried out on two examples to provide masking functions of length 128. The following are the two resulting quasi orthogonal function's which are fat-pipe optimal. In this improvement the correlation of every subblock of the quasi orthogonal function with the corresponding shorter length Walsh code is optimal. Two examples of optimal masking functions of length 128 are provided in Table IV. The correlation results for a number of values of n are shown in Table V.

TABLE IV

[1j1-j1j-1j1j1-j-1-j1-j1j1-j1j-1j-1-j-1j1j-1j1j1-j-1-j1-j1j1-j
1j-1j1j1-j-1-j1-j-1-j1-j-1j1j-1j1j1-1j-1j-1-j-1j1j-1j1j1-j-1-
j1-j1j1-1j-1j-1-j-1j1j-1-j-1-j1j1-1-j-1-j-1j-1-j-1-j-1j]
[1jj-1-j11j-1-j-j1-j11j-j1-1-j1j-j1-j1-1-j-1-jj-1j11-j-1jj1-j-1
-1j-1jj11-jj1-j-11-j1-jj1j1-1j-j11j1jj-1j-1-1-j1jj-11j-j1-j1
-1-j1j-j1j-11j1-j-j-1-j-1-1-1j1-j-1-1jj1-1j-1j-j-1j1-1j1-jj1]

TABLE V

| QOF | Walsh Code Length | | | | | |
|---|---|---|---|---|---|---|
| Length | 256 | 128 | 64 | 32 | 16 | 8 |
| 256 | 0.0625 | 0.0883 | 0.125 | 0.177 | 0.25 | 0.35 |
| 128 | | 0.0883 | 0.125 | 0.177 | 0.25 | 0.35 |
| 64 | | | 0.125 | 0.177 | 0.25 | 0.35 |
| 32 | | | | 0.177 | 0.25 | 0.35 |

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. Furthermore, it will be understood that the permutation method set forth herein is not limited to use in forming two phase and four phase quasi orthogonal vectors. Rather, it can be used as part of any method or apparatus for forming any kind of encoded message signal for any kind of signal transmitted within a communications system.

What is claimed is:

1. A method of transmitting a wireless signal comprising:
   applying a QPSK quasi orthogonal code vector to a data signal to produce a coded message signal, wherein the QPSK quasi orthogonal code vector is optimized to have minimal correlation with a set of orthogonal codes and all sub-blocks of said set of orthogonal codes having $2^r$ chips, where r is an integer; and transmitting the coded message signal.

2. An apparatus for transmitting a wireless signal comprising:
   means for applying a QPSK quasi orthogonal code vector to a data signal to produce a coded message signal, wherein the QPSK quasi orthogonal code vector is optimized to have minimal correlation with a set of orthogonal codes and all sub-blocks of said set of orthogonal codes having $2^r$ chips, where r is an integer; and
   means for transmitting the coded message signal.

3. An apparatus for transmitting a wireless signal comprising:
 a mixer for applying a QPSK quasi orthogonal code vector to a data signal to produce a coded message signal, wherein the QPSK quasi orthogonal code vector is optimized to have minimal correlation with a set of orthogonal codes and all sub-blocks of said set of orthogonal codes having $2^r$ chips, where r is an integer; and
 a transmitter for transmitting the coded message signal.

* * * * *